United States Patent [19]

Friedmann et al.

[11] Patent Number: 5,166,298
[45] Date of Patent: Nov. 24, 1992

[54] OXYGEN-PERMEABLE TRANSPARENT POLYMER COMPOSITIONS FOR CONTACT LENSES OF THE RIGID TYPE

[75] Inventors: Gilbert Friedmann, Strasbourg; Pascal Sperry, Blienschwiller; Jean Brossas, Strasbourg, all of France

[73] Assignee: Essilor International (Compagnie Generale d'Optique), Creteil, France

[21] Appl. No.: 467,401

[22] Filed: Jan. 18, 1990

[30] Foreign Application Priority Data

Jan. 19, 1989 [FR] France .................. 89 00593

[51] Int. Cl.⁵ .................................. C08G 77/00
[52] U.S. Cl. .................. 528/27; 351/160 R; 525/105; 525/937; 526/279
[58] Field of Search ............ 351/160 R; 525/479, 525/937, 105; 526/279; 528/43, 27

[56] References Cited

U.S. PATENT DOCUMENTS

| | | | |
|---|---|---|---|
| 3,139,409 | 6/1964 | Meston | 528/43 |
| 4,332,922 | 6/1982 | Kossmehl et al. | 525/479 |
| 4,487,905 | 12/1984 | Mitchell | 351/160 R |
| 4,594,401 | 6/1986 | Takahashi et al. | 526/279 |
| 4,622,376 | 11/1986 | Misura et al. | |

OTHER PUBLICATIONS

G. Odian, Principles of Polymerization, 1970, pp. 32 and 33.

Primary Examiner—John C. Bleutge
Assistant Examiner—D. E. Aylward
Attorney, Agent, or Firm—Millen, White, Zelano and Branigan

[57] ABSTRACT

An oxygen-permeable transparent polymer composition for contact lenses of the rigid type comprises at least a first constituent having ethylene double bonds of the type which is polymerizable in a rigid matrix, and a second constituent formed by a silane monomer containing at least two silyl -SiH groups per molecule. The composition can include a third constituent of the polyorganosiloxysilane type.

11 Claims, No Drawings

OXYGEN-PERMEABLE TRANSPARENT POLYMER COMPOSITIONS FOR CONTACT LENSES OF THE RIGID TYPE

BACKGROUND OF THE INVENTION

1. Field of the Invention

The present invention relates to the composition and utilization of transparent polymers which are suitable in particular for the manufacture of rigid-type contact lenses.

2. Description of the Prior Art

It is known that, for this type of application, polymers must essentially be permeable to the gaseous oxygen of the atmosphere since absence of oxygen in the vicinity of the cornea prohibits wearing of the lenses over long periods. In the case of polymers of acrylic esters (usually of the methacrylic type) which are in particularly frequent use as contact lens materials, it has often been proposed to modify them by copolymerization with organic siloxanes in order to improve their permeability to oxygen. However, since the introduction of siloxanes produces acrylic silicones, it has the disadvantage of reducing other properties which are required of contact lenses, such as transparency, shock resistance, breaking strength, dimensional stability and durability.

Up to the present time, the research effort to solve these difficulties have essentially remained directed towards the choice of special highly branched polysiloxanes carrying unsaturated end groups which permit copolymerization with the acrylic esters of the basic composition, to which are usually added crosslinking agents constituted by polyfunctional unsaturated monomers. Transparent polymers for rigid contact lenses are described in particular in French patents No. 2,255,320, No. 2,417,782, No. 2,517,834, No. 2,533,933. In all cases, the silicone-type constituent is an acrylic (or methacrylic) ester of an organosiloxane. In the molecules therefore considered here, all the silicon atoms of the

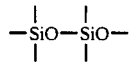

chains are saturated by carbon groups such as methyl or phenyl and the property of polymerization is conferred by acrylic (or methacrylic) groups fixed on methylene radicals at the end of the chain.

These polymers have failed to provide a satisfactory solution to the above-mentioned problem of oxygen permeability of contact lenses. Moreover, the choice of suitable constituents appears complex and polymerization of these acrylic esters involves reactions of the radical type which, in practice, prohibit the manufacture of lenses by casting directly in their final shape.

In order to avoid the various disadvantages of the prior art techniques, the present invention proposes to make use of silicones or silanes of a different type in which the reactivity is due to silyl

groupings and to copolymerize them with crosslinking in a rigid matrix with a constituent having ethylenic double bonds.

In point of fact, polymerization reactions of this type, by hydrosilylation of olefinic bonds, have already been used, but in other fields of application of polymers involving compositions which lead to global properties other than those which are sought for rigid contact lenses. Thus French patent No. 2,536,752 describes compositions prepared from diene polymers having both dangling double bonds and silyl end groups, possibly with addition of disilylsilanes as coupling agents, for the sole purpose of giving flexibility to cross-linked polymers which serve as binding agents in adhesives or coatings. Other patents such as U.S. Pat. No. 3,284,406, U.S. Pat. No. 3,436,366 and U.S. Pat. No. 4,077,943 contemplate reactions of the same type within a silicone elastomer between vinyl end groups of an organopolysiloxane and the silyl groups of an organohydrogenopolysiloxane. Finally, the addition reaction of a compound having a vinyl, acrylic or methacrylic double bond on the silyl groups of a partially silane organopolysiloxane (therefore an organohydrogenopolysiloxane) has sometimes been employed, as in European patent No. 0,033,754, for grafting hydrophilic molecules at the surface of contact lenses of silicone elastomer.

SUMMARY OF THE INVENTION

As a function of the foregoing, the present invention is directed to a polymeric material which is suitable for the manufacture of oxygen-permeable contact lenses of the rigid type, comprising a rigid matrix obtained by copolymerization, through a poly-addition reaction, between a constituent having ethylenic double bonds and at least a disilane constituent in which the silyl SiH groups react with the double bonds of the first constituent.

This at least is the scientific interpretation of the reactions which take place at the time of preparation of the material from a composition containing the two aforementioned constituents, usually in the presence of polymerization catalysts known per se. But it must be understood that these explanations cannot justify a limitative definition of the invention and that, similarly, the application to contact lenses cannot be considered as restrictive. On the contrary, the invention can extend to other applications, especially in cases in which the oxygen permeability, mechanical strength and durability represent important criteria in the choice of materials.

The invention is also directed to a polymer composition which can be utilized by means of any technique known per se in order to produce the materials defined earlier.

The aforesaid composition, which accordingly results in particular in transparent polymers which are well-suited to the manufacture of contact lenses of the rigid type essentially comprises at least a first constituent having ethylenic double bonds of the type which is copolymerizable in a rigid matrix and, as a second constituent, a silane monomer containing at least two silyl SiH groups per molecule.

The concept of silanes will be retained here for compounds which are sometimes designated as hydrogenosilanes in the prior art : they contain silyl groups which are capable of undergoing addition reactions on the double bonds of the polyene which forms the first constituent. Consideration may nevertheless be given within the scope of the invention to polysiloxypolysilanes, these latter being intended to designate the molecules of organopolysiloxanes in which certain silicon atoms which are not fully substituted by alkyl or aryl radicals form silyl -SiH groups.

Preferably, the silane monomer employed carries two silyl groups located at the end of the chain.

Moreover, it has been found possible to obtain a macromolecular lattice having a high crosslinkage density which is conducive to high rigidity, starting either from plurifunctional monomers including at least one trifunctional monomer or from monomers having a relatively condensed structure, that is to say having a cyclic structure or in which the straight chains remain short and encumbered with substituents between two functional groupings, or else by adding to the composition a third constituent of the organopolysiloxane type comprising a number of silyl groups distributed within the molecule.

In preferred compositions in accordance with the invention, the first constituent is a cylic compound carrying radicals having ethylene double bonds, which advantageously contain 2 to 5 carbon atoms, this compound being at least a diene and preferably a triene. This is the case in particular with the derivatives of triazine, cyclohexane or benzene, especially the trivinyl or triallyl derivatives, which represent particularly advantageous constituents within the scope of the invention.

In other compositions of the invention which permit the achievement of advantageous results, the polyene constituent is polybutadiene, preferably in a liquid form at room temperature and having numerous pendant double bonds on the straight chain, for example in which at least 30 % of the double bonds contained in a molecule are pendant dangling bonds.

So far as concerns the silane constituents, preference may be given to aryl hydrocarbons having at least two dialkylsilane or alkylarylsilane groupings in which the alkyl and aryl groups are chosen in particular from the methyl and phenyl groups. Consideration may also be given to organosiloxanes which preferably contain at least one aryl hydrocarbon substituent such as the phenyl group and in which the silane Si-H bonds are preferably at least as numerous as the siloxane Si-O bonds. Examples of such compounds are: tetramethyldisiloxane, tetramethylcyclotetrasiloxane, bis-(dimethylsilyl) benzene or a corresponding dialkyl or arylalkyl homolog, the alkyl-tris-(dialkylsiloxy) silanes in which the alkyl radicals are each formed in particular by a methyl group, and the aryl-(tris-dialkylsiloxy)-silanes in which the alkyl radicals are in particular methyl groups and the alryl radical is in particular the phenyl group.

In accordance with a secondary feature of the invention, already mentioned, the composition advantageously contains a third constituent of the siloxysilane type. This latter can be selected so as to include the aryl and especially phenyl rings which have appeared as desirable in the composition as a whole. However, it is usually preferred to include these aryl nuclei in what has been considered as the second constituent in order to confer on this latter optimum efficiency of participation in the formation of a rigid matrix with the first olefinic constituent and in order to reserve for the third constituent a principal function of enhancement of oxygen permeability of the final polymer.

Accordingly, the compounds employed are preferably straight-chain or branched-chain polyorganosiloxanes containing silyl groups distributed within the chain, in molecules comprising advantageously at least 3 and preferably 5 to 15 siloxane units. Their optimum proportion is usually within the range of 5 to 50 % and preferably 20 to 40 % by weight with respect to the weight of the total composition. Moreover, this third constituent may if necessary be employed for introducing into the entire composition different active groupings of the ethylene and silyl groups which are essential to the polymerization reaction employed in accordance with the invention, these different active groupings being previously grafted on the organopolysiloxane chain.

Whether the composition is of the type containing two or three essential constituents, the relative proportions of the constituents of the composition as a whole are advantageously selected as a function of the stoichiometry, with the result that the ratio between the -SiH groups and the double bonds is within the range of 0.5 to 1.5 and preferably 0.8 to 1.2. Moreover, each of the essential constituents may itself be a mixture of several compounds which perform equivalent functions in the formation of the polymer.

DETAILED DESCRIPTION OF THE INVENTION

There will now be described in greater detail particular embodiments of the invention which will be conducive to a better understanding of its characteristic features and essential advantages within the framework of particular examples of compositions and modes of execution of the invention.

There are described in these examples modes of preparation of polymers which are specially suited to the manufacture of rigid contact lenses obtained from various compositions. On these polymers which are all transparent, the coefficients of oxygen permeability are measured by the polarographic method and expressed in $cm^3.cm.cm^{-2}$ of oxygen in volume (under normal conditions of temperature and pressure) per mmHg of pressure and per second (flow rate x thickness/surface area).

According to this method, a membrane made of the polymer is disposed as a wall separating an inner compartment from an outer compartment both filled with water. Constant oxygen concentration is maintained in the outer compartment under magnetic stirring, while molecular oxygen passing to the inner compartment through the membrane is reduced to oxydryl ions by a polarographic gauge. When the process has come to dynamic equilibrium through constant electric consumption of oxygen in the inner compartment, which shows as a constant oxygen concentration, the measurement of the electric current produced gives an indication of the amount of oxygen passing through the membrane per unit time. The permeability coefficient DK is finally expressed depending on the thickness and involved surface area of the membrane.

The materials of the invention show a coefficient of oxygen permeability DK higher than 3 and preferably from 15 to 30.

I - Examples With Two Constituents

A first constituent having ethylene double bonds is selected from the olefinic compounds which are preferably monomers and capable of producing rigid matrices by copolymerization. The second constituent is a monomer of at least disilane type.

The monomer having ethylene double bonds and the monomer of at least disilane type are distilled prior to use. the hydrosilylation reaction is catalyzed by hexachloroplatinic acid $H_2PtCl_6,6H_2O$ (mol.wt.=518) in solution in isopropanol at a molar concentration of $2\times10^{-2}$. The reaction takes place in an argon atmosphere at 100° C. or in certain cases at 140° C. in order to obtain the polymer lattice at the end of one hour.

The concentration of catalyst in the reaction medium is of the order of $10^{-5}$ molar, which corresponds to a ratio $H_2PtCl_6/olefin=2\times10^{-6}$. These concentrations, which can be employed for small quantities of product (less than 0.5 gram) in the laboratory, will be reduced at least by a factor of 10 in industrial practice.

In accordance with a particular mode of operation, the two constituents are mixed in proportions corresponding substantially to stoichiometry of the hydrosilylation reaction, in a flask of 25 ml fitted with a magnetic rod. The medium is cooled to 0° C. in an ice bath and the catalyst is added with agitation. It is degassed by a number of vacuum-argon cycles, thus making it possible to remove impurities such as isopropanol, water, oxygen.

The solution thus prepared is poured into molds having a shape which is suitable for the subsequent application of the polymers obtained. In particular, they can have the shape of contact lenses, of cylinders or disks to be machined subsequently. The mold containing the solution is then placed in a drying oven at 100° C. After approximately twelve hours, the samples are removed from the molds. These samples are then subjected to baking at 240° C. in the vacuum produced by a vane pump over a period of two hours. After baking, the samples are cooled slowly in order to avoid any tensions and cracks in the material.

In accordance with this mode of operation, the following polymers have been obtained in transparent and rigid form for contact lenses with the following compositions:

| 1) Triallyl-1,3,5-triazine-2,4,6 (1H,3H,5H)-trione | 2 moles |
|---|---|
| p-bis(dimethylsilyl) benzene | 3 moles |
| 2) Triallyl-1,3,5-triazine-2,4,6 (1H,3H,5H)-trione | 1 mole |
| Phenyl tris(dimethylsiloxy)silane | 1 mole |
| Coefficient of oxygen permeability | 3.8 |
| 3) 1,2,4-trivinylcyclohexane | 2 moles |
| p-bis(dimethylsilyl)benzene | 3 moles |
| Coefficient of oxygen permeability | 3.1 |
| 4) 1,2,4-trivinylcyclohexane | 1 mole |
| Phenyl tris(dimethylsiloxy)silane | 1 mole |
| Coefficient of oxygen permeability | 6.9 |

II - Examples With Three Constituents

The same mode of operation is applied to compositions comprising in addition a constituent of the polysiloxysilane type by adapting the relative proportions of the olefinic constituent and of the silane constituent (expressed in this case by weight) by modifying those of the preceding examples in order to take into account the overall stoichiometry of the hydrosilylation reactions of the double bonds.

It has been observed that the results are substantially the same when synthesizing the polymers in two steps. In this case, the olefin is reacted with the silane or the siloxane in a first step in order to obtain a prepolymer in which olefinic unsaturated bonds remain and the third constituent is added in the second step. In order to accelerate the cross-linking reaction, catalyst can be added with the polysiloxane ($3\times10^{-6}$ l of a $2\times10^{-2}$ M solution).

In this mode of operation, the following polymers have been obtained in transparent and rigid form for contact lenses with the following compositions:

| 1) Triallyl-1,3,5-triazine-2,4,6 (1H,3H,5H) trione | 1 g |
|---|---|
| p-bis(dimethylsilyl)benzene | 0.9 g |
| Poly(dimethyl-co-methylhydro)siloxane with dimethylsilane terminations ($M_n$: approx. 4000 - viscosity: 60 cSk - 0.32 SiH for 100 g) | 0.86 g |
| Coefficient of oxygen permeability | 13.7 |
| 2) Triallyl-1,3,5-triazine-2,4,6 (1H,3H,5H) trione | 1 g |
| p-bis(dimethylsilyl)benzene | 1 g |
| Poly(dimethyl-co-methylhydro)siloxane with dimethylsilane terminations ($M_n$: approx. 2400 - viscosity: 30 cSk - 0.25 SiH per 100 g) | 1 g |
| Coefficient of oxygen permeability | 16 |
| 3) Triallyl-1,3,5-triazine-2,4,6 (1H,3H,5H) trione | 1 g |
| p-bis(dimethylsilyl)benzene | 0.9 g |
| Poly(dimethyl-co-methylhydro)siloxane with trimethylsilane terminations ($M_n$: approx. 1000 - viscosity: 8 cSk - 0.36 SiH per 100 g) | 0.84 g |
| Coefficient of oxygen permeability | 7.8 |
| 4) 1,2,4-trivinylcyclohexane | 1 g |
| p-bis(dimethylsilyl)benzene | 1.3 g |
| Poly(dimethyl-co-methylhydro)siloxane with dimethylsilane terminations ($M_n$: approx. 4000 - viscosity: 60 cSk - 0.32 SiH per 100 g) | 1.3 g |
| Coefficient of oxygen permeability | 19 |
| 5) 1,2,4-trivinylcyclohexane | 1 g |
| p-bis(dimethylsilyl)benzene | 1.33 g |
| Poly(dimethyl-co-methylhydro)siloxane with dimethylsilane terminations ($M_n$: approx. 1000 - viscosity: 8 cSk - 0.36 SiH per 100 g) | 1.34 g |
| Coefficient of oxygen permeability | 16.4 |
| 6) 1,2,4-trivinylcyclohexane | 1 g |
| p-bis(dimethylsilyl)benzene | 1.72 g |
| Poly(dimethyl-co-methylhydro)siloxane with dimethylsilane terminations ($M_n$: approx. 2400 - viscosity: 30 cSk - 0.25 SiH per 100 g) | 0.3 g |
| Coefficient of oxygen permeability | 18 |
| 7) 1,2,4-trivinylcyclohexane | 1 g |
| p-bis(dimethylsilyl)benzene | 1.53 g |
| Poly(dimethyl-co-methylhydro)siloxane with dimethylsilane terminations ($M_n$: approx. 2400 - viscosity: 30 cSk - 0.25 SiH per 100 g) | 1.1 g |
| Coefficient of oxygen permeability | 25 |
| 8) 1,2,4-trivinylcyclohexane | 1 g |
| p-bis(dimethylsilyl)benzene | 1.44 g |
| Poly(dimethyl-co-methylhydro)siloxane with dimethylsilane terminations ($M_n$: approx. 2400 - viscosity: 30 cSk - 0.25 SiH per 100 g) | 1.48 g |
| Coefficient of oxygen permeability | 28 |
| 9) 1,2,4-trivinylcyclohexane | 1 g |
| p-bis(dimethylsilyl)benzene | 0.73 g |
| 1,1,3,3-tetramethyldisiloxane | 0.74 g |
| Coefficient of oxygen permeability | 3.5 |
| 10) 1,2,4-trivinylcyclohexane | 1 g |
| p-bis(dimethylsilyl)benzene | 1 g |
| 1,1,3,3,5,5-hexamethyltrisiloxane | 0.86 g |
| Coefficient of oxygen permeability | 6.1 |
| 11) 1,2,4-trivinylcyclohexane | 1 g |
| p-bis(dimethylsilyl)benzene | 1.16 g |
| 1,1,3,3,5,5,7,7-octamethyl tetradisiloxane | 0.93 g |
| Coefficient of oxygen permeability | 8 |
| 12) 1,2,4-trivinylcyclohexane | 1 g |
| p-bis(dimethylsilyl)benzene | 1.45 g |
| Polydimethyloctosiloxane | 1.05 g |

| | |
|---|---|
| -continued | |
| Coefficient of oxygen permeability | 18 |
| 13) 1,3,5-trivinylbenzene | 1 g |
| p-bis(dimethylsilyl)benzene | 1.5 g |
| Poly(dimethyl-co-methylhydro)siloxane with dimethylsilane terminations ($M_n$: approx. 2400 - viscosity: 30 cSk - 0.25 SiH per 100 g) | 1.53 g |
| Coefficient of oxygen permeability | 29 |

It is apparent from these examples that, in the case of the third constituent, straight-chain polysiloxane-silane was employed in combination with a second constituent formed of a compound having two aryl-dialkyl-silane functions. In the case of the short chains, the silane functions are at the end of the chain. In the long chains comprising from 5 to 15 siloxane units, 30 to 70% of these latter are also silanes and are distributed along the chain.

The most useful proportions of this third constituent are higher than approximately 10% and mostly within the range of 20 to 40% by weight with respect to the total weight of the composition.

III - Examples Employing Modified Polysiloxanes

In polymethylhydrosiloxane :

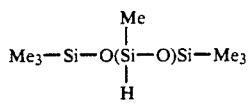

($M_n$=2500-1.56 SiH per 100 g) supplied by the Rhône Poulenc Company under the name "Hydrofugeant 68", the following monomers are fixed at different grafting rates:
tris(trimethylsiloxy)vinylsilane,
styrene
norbornene
diphenyl-1,1-ethylene
the grafting rates corresponding for example to 50% of the SiH functions.

These modified polysiloxanes can be employed as a total or partial substitute for the polysiloxysilane constituent of the preceding examples, in the cross-linkage of the disilane constituent.

Satisfactory polymers having enhanced rigidity are thus prepared from the following compositions:

| | |
|---|---|
| 1) Triallyl-1,3,5-triazine-2,4,6 (1H,3H,5H) trione | 1 g |
| p-bis(dimethylsilyl)benzene (Polymethylhydrosiloxane grafted at 15% by tris(trimethylsiloxy) vinylsilane as a substitute for the hydrogen atoms of the methylhydroxysiloxane groups - $M_n$: approx. 2700) | 0.9 g |
| 2) 1,2,4-trivinylcyclohexane | 1 g |
| p-bis(dimethylsilyl)benzene | 1.2 g |
| Polysiloxane modified as above with 20% grafting | 0.9 g |
| 3) 1,3,5-trivinylbenzene | 1 g |
| p-bis(dimethylsilyl)benzene | 1.5 g |
| Polysiloxane modified by diphenyl-1,1-ethylene with 15% grafting | 1.5 g |

It is understood that, in these examples, polysiloxane-polysilane employed as a second constituent is modified by grafting of unsaturated monomers on part (usually 10 to 60%) of its silyl groups distributed in the straight chain.

IV - Examples Employing Polybutadiene

A monohydrodisiloxane is added by hydrosilylation to polybutadiene marketed by Revertex France under the name of Lithene having a molecular weight of approximately 2000 and a distribution of double bonds 1-2/1-4 of the order of 50/50 and said monohydrodisiloxane corresponds to the formula:

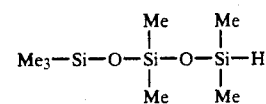

or

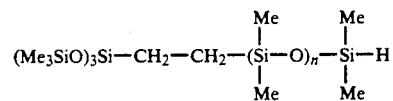

where Me designates the methyl radical and n is equal to 1 or 2, these compounds being prepared by reaction 1,1,3,3-tetramethyldisiloxane with a suitable olefin.

The reaction is carried out under conditions such that hydrosilylation is primarily applied to the dangling double bonds of polybutadiene, the substituted double bond of this latter being less reactive with respect to the silicon hydride function.

The grafting reaction of monohydrosiloxane on polybutadiene is carried out in an organic solvent such as tetrahydrofurane (THF) or toluene.

By way of example, into a flask having a capacity of 50 ml, there are introduced 1 g of polybutadiene and 0.85 g of monohydrosiloxane having the second formula given above in which n=1, 5 ml of anhydrous THF and 40 microliters of hexachloroplatinic acid solution. The reaction is allowed to proceed for two days at 70° C. in an argon atmosphere. The solvent is then evaporated. To the transparent polymer obtained is added 0.72 g of p-bis-(dimethylsilyl) benzene. After homogenization, the viscous solution is poured into a mold which is then heated to 100° C. over a period of twelve hours.

There is thus obtained a rigid transparent polymer having a coefficient of oxygen permeability of 12.

In another example, there was carried out the polyaddition of 0.72 g of p-bis(dimethylsilyl) benzene on 1 g of the same polybutadiene but without siloxane and a rigid transparent copolymer with a coefficient of oxygen permeability of 5.3 was thus obtained.

Similar polymers are obtained from liquid polybutadienes in which the distribution between the double bonds 1-2 and 1-4 varies between 100/0 and 30/70. The proportion of dangling double bonds is preferably within the range of 40 to 70%.

It will be readily apparent that the invention is not limited in any sense by the particular features which have been specified in the foregoing examples or by the details of the particular modes of execution which have been chosen in order to illustrate the invention. All kinds of alternatives may be considered in regard to the operating conditions described above by was of example, as well as in regard to the nature and proportions of the constituent elements of the composition, without thereby departing either from the scope or from the spirit of the invention. Thus the invention includes all means which constitute technical equivalents of the means described as well as the combinations thereof.

What is claimed is:

1. A rigid contact lens of a copolymer consisting essentially of an oxygen-permeable rigid transparent copolymer composition comprising a first constituent having ethylenic double bonds and selected from (a) polybutadiene compounds with at least 30% of the double bonds being pendant bonds and (b) triazine, cyclohexane or benzene compounds having at least two double bonds, carrying radicals comprising from 2 to 5 carbon atoms, and including ethylenic double bonds and (c) mixtures thereof and a second constituent formed of a silane monomer containing at least two silyl - SiH groups per molecule, said copolymer being distributed substantially throughout said contact lens.

2. A contact lens according to claim 1 wherein said first constituent is selected from trivinyl or triallyl derivatives of triazine, cyclohexane, and benzene.

3. A contact lens according to claim 2 wherein said second constituent of the silane type is an aryl compound carrying at least two dialkylsilane or alkylarylsilane groupings in which the alkyl or aryl groups are selected from the methyl and phenyl groups.

4. A contact lens according to claim 1 wherein said second constituent of the silane type is an aryl compound carrying at least two dialkylsilane or alkylarylsilane groupings in which the alkyl or aryl groups are selected from the methyl and phenyl groups.

5. A contact lens according to claim 4, wherein said second constituent is a bis(dialkylsilyl)silane or a bis(alkylaryl)silane.

6. A contact lens according to claim 1, wherein said second constituent of the silane type is selected from the organosiloxanes having at least one aryl hydrocarbon substituent and in which the silane Si-H bonds are at least as numerous as the siloxane Si-O bonds.

7. A method of producing the contact lens according to claim 1, wherein said constituents are mixed in proportions corresponding substantially to the reactions of hydrosilylation of the double bonds of the first constituent by the silyl groups of the other constituent or constituents and polymerized in the presence of a catalyst and wherein the polymer obtained in cast in molds and subjected to baking after removal from the mold.

8. A contact lens according to claim 1 wherein the second constituent is p-bis(dimethylsilyl)-benzene.

9. A contact lens according to claim 6 wherein at least one aryl hydrocarbon group is phenyl.

10. A contact lens according to claim 3, wherein the first constituent is triallyl-1,3,5-triazine-2,4,6(1H,3H,5H)trione.

11. A contact lens according to claim 8, wherein the first constituent is triallyl 1,3,5-triazine-2,4,6(1H,3H,5H)trione.

* * * * *